| United States Patent [19] | [11] | 4,415,872 |
|---|---|---|
| Karabinis | [45] | Nov. 15, 1983 |

[54] ADAPTIVE EQUALIZER

[75] Inventor: Peter D. Karabinis, Atkinson, N.H.

[73] Assignee: Bell Telephone Laboratories, Incorporated, Murray Hill, N.J.

[21] Appl. No.: 293,463

[22] Filed: Aug. 17, 1981

[51] Int. Cl.³ .......................... H04B 3/14; H03H 7/03
[52] U.S. Cl. ................................... 333/18; 333/28 R; 333/166; 375/101; 375/14; 455/305
[58] Field of Search ....................... 333/28 R, 166, 18; 375/14, 99–103; 455/52, 65, 305; 307/358; 330/151

[56] References Cited

U.S. PATENT DOCUMENTS

| 3,551,854 | 12/1970 | Endo et al. | 333/28 R |
|---|---|---|---|
| 3,794,935 | 2/1974 | Tsuchiya et al. | 333/28 R |
| 3,947,768 | 3/1976 | Desblache et al. | 333/28 R X |
| 3,949,325 | 4/1976 | Berkovitz | 333/28 R |
| 4,125,899 | 11/1978 | Kawai et al. | 333/28 R X |
| 4,156,876 | 5/1979 | Debuisser | 333/166 X |
| 4,258,340 | 3/1981 | Ryu | 333/18 |
| 4,330,764 | 5/1982 | Miedema | 333/18 |

Primary Examiner—Paul L. Gensler
Attorney, Agent, or Firm—S. Sherman

[57] ABSTRACT

The dispersive effects of frequency selective fading in a digital, FM, or AM radio system are reduced by means of an adaptive equalizer (11) comprising a cascade of feed-forward stages (1,2, ... N), each of which includes: a first parallel wavepath (1-1, 1-2, ... 1-N) including a first adjustable attenuator (20-1, 20-2, ... 20-N); a second parallel wavepath (2-1, 2-2, ... 2-N) including a second adjustable attenuator (21-1, 21-2, ... 21-N) and delay means (22-1, 22-2, ... 22-N); and means (23-1, 23-2, ... 23-N) for combining the signals in said wavepaths and for coupling said combined signal to the next stage. By a suitable selection of parameters, according to two unique relationships, a transfer function can be realized which can compensate for amplitude and delay distortions caused by minimum and nonminimum phase fades.

6 Claims, 12 Drawing Figures

FIG. 2

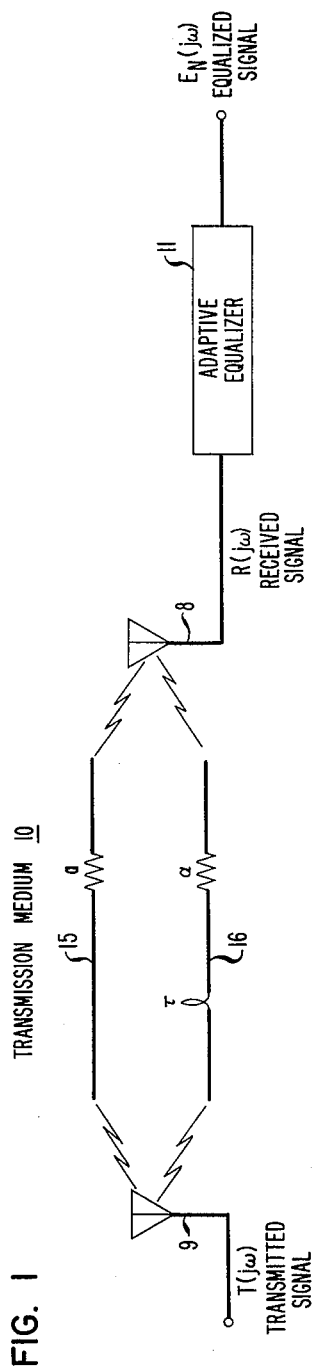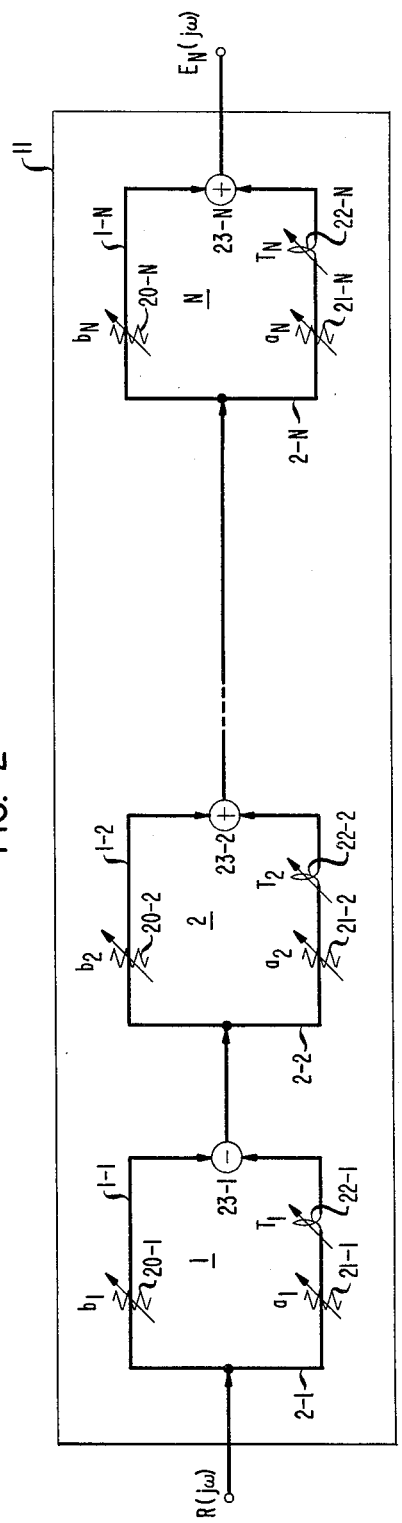
FIG. 1
FIG. 2

ADAPTIVE EQUALIZER

TECHNICAL FIELD

This invention relates to signal equalizers and, in particular, to adaptive fade equalizers.

BACKGROUND OF THE INVENTION

It has been found that amplitude and delay distortion resulting from multipath fading can, under certain conditions, be a major cause of transmission deterioration in both digital and FM radio communications systems. Experimental and analytical evidence indicate that outages of wideband digital systems, caused by this phenomenon (i.e., frequency selective fading), may exceed system performance objectives. This means that techniques for handling flat fades, such as AGC, will not be adequate to maintain satisfactory wideband digital transmission, and that additional correction will be required. Even the use of space diversity techniques will not eliminate completely the problems associated with selective fading. The use of some form of equalization will still be required to achieve the desired level of system performance. (See, for example, U.S. Pat. No. 4,261,056, filed July 16, 1979, and assigned to applicant's assignee.)

The problem, however, is that signal fading resulting from multipath transmission is basically unpredictable. Accordingly, the compensation introduced by a fade equalizer must be capable of automatically adapting to the changing signal conditions. One such adaptive equalizer, employing feedback techniques, is disclosed by H. Miedema in his copending application, Ser. No. 158,404, filed June 11, 1980, now U.S. Pat. No. 4,330,764. While this equalizer compensates the amplitude distortion, it does not provide delay equalization in the case of nonminimum phase fades. Indeed, for a nonminimum phase fade, the delay distortion is doubled. In another variation of the feedback equalizer, disclosed in a copending application by G. D. Martin, Ser. No. 203,645, filed Nov. 3, 1980 now U.S. Pat. No. 4,361,892, all-pass networks, which are more difficult to realize, are used to compensate the delay distortion for both minimum and nonminimum phase fades.

SUMMARY OF THE INVENTION

In its most general form, an adaptive equalizer, in accordance with the present invention, comprises a cascade of feed-forward stages, each one of which includes: a first parallel wavepath including a first adjustable attenuator; a second parallel wavepath including a second adjustable attenuator and an adjustable delay network; and means for combining the signals in the two wavepaths in a common output.

When used as an adaptive fade equalizer, control means are provided for adjusting the equalizer parameters in response to changes in the fade characteristics.

It is an advantage of the present invention that because of the unique relationship among the elements of the different equalizer stages, all of the stages can be adjusted simultaneously. In particular, it is shown that only the attenuator elements need be adjusted dynamically during fade conditions. The delay elements can be fixed and the fade notch translated into frequency coincidence with the equalizer bump frequency.

It is a further advantage of the invention that it produces simultaneous amplitude and delay equalization of the received signal for both minimum and nonminimum phase fades. Finally, by using only feed-forward sections, instead of feedback, instability problems during nonminimum phase fades are avoided.

An alternative, transversal filter equivalent of the feed-forward equalizer is also disclosed.

BRIEF DESCRIPTION OF THE DRAWING

FIG. 1 shows a portion of a radio communication system including a multipath transmission medium;

FIG. 2 shows an adaptive equalizer in accordance with the present invention;

DETAILED DESCRIPTION

Figure 3:
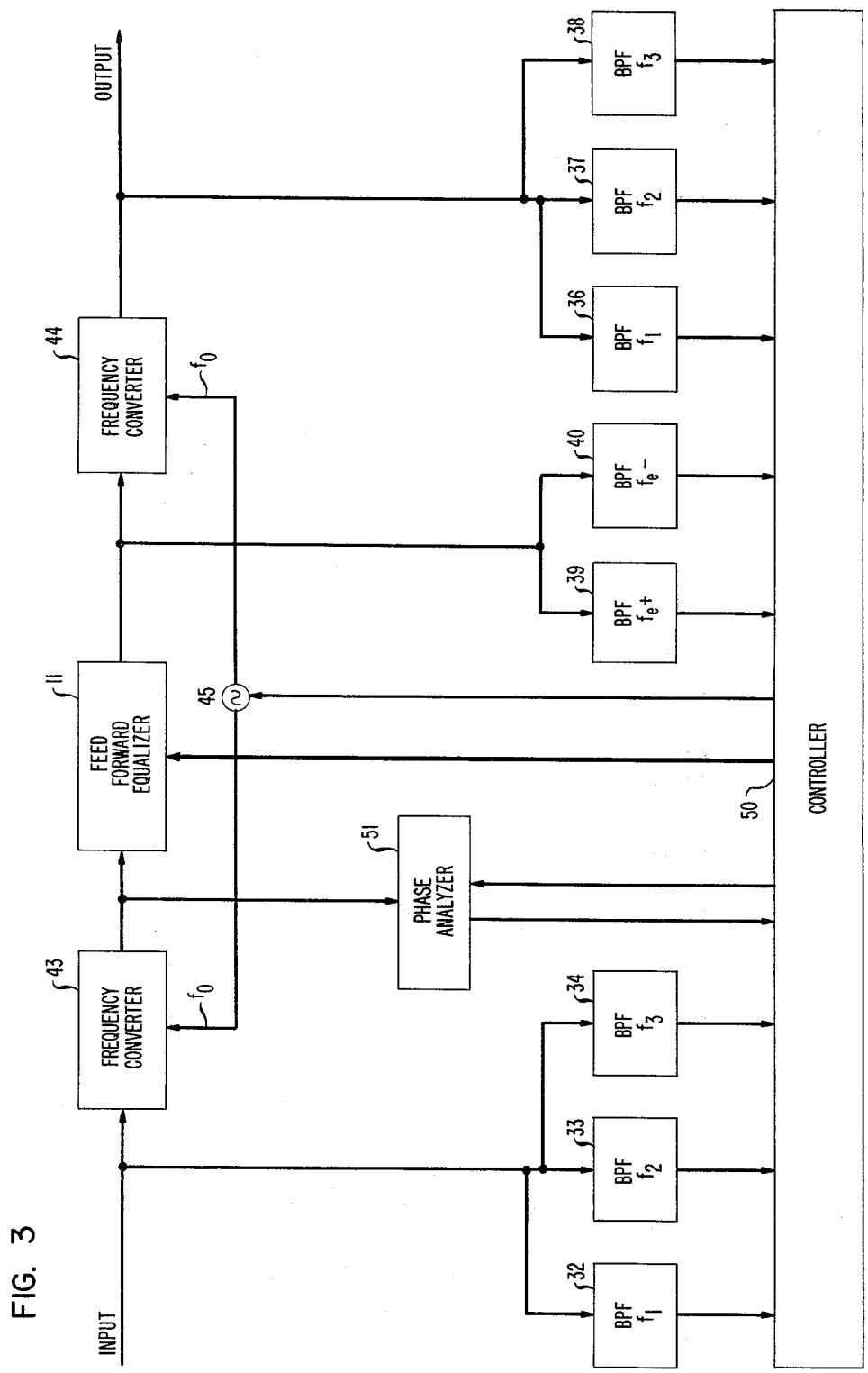
FIG. 3 shows, in block diagram, an arrangement for automatically controlling the parameters of the equalizer of FIG. 2.

While the present invention can be employed in any situation wherein signal equalization is desired, in the discussion that follows its use as a multipath fade equalizer will be described.

Referring to the drawings, FIG. 1 shows a portion of a radio communication system including a transmission source 9, a multipath transmission medium 10 and, at the receiver 8, an adaptive equalizer 11. In a moderately broadband system, the transmission medium 10 can be reasonably represented by a two-path model. Thus, in FIG. 1 medium 10 is shown to include a direct path 15 between the transmission source and the receiver, and an indirect path 16. The former is characterized by a gain factor a. The latter is characterized by a relative delay $\tau$ and a gain factor $\alpha$, where $\tau$, $\alpha$ and a vary as functions of time.

At the receiver, the total received signal $R(j\omega)$, includes a direct path component and an indirect path component and is given by $$R(j\omega) = a(1 + be^{-j\omega\tau})T(j\omega) \qquad (1)$$

where a is a scale parameter;
b is a shape parameter;
$\tau$ a fixed delay difference in the channel;
$ab = \alpha$;
and both the received signal $R(j\omega)$ and the transmitted signal $T(j\omega)$ are complex functions.

It can be shown that when the amplitude of the delayed signal is less than that of the direct signal (i.e., $b < 1$), the transmission medium is a so-called "minimum phase shift network." When the amplitude of the delayed signal is greater than the direct path signal (i.e., b>1), the medium has the characteristics of a "nonminimum phase shift network." (For a discussion of minimum phase shift networks, see "Network Analysis and Feedback Amplifier Design," by H. W. Bode, published by D. Van Nostrand Company, Inc. of New York, Fourth Printing, pp. 242 et seq.)

A fade notch occurs when the two received signal components destructively interfere. The function of the equalizer is to reduce the inband amplitude and delay distortion produced by the fade such that the equalized signal, $E_N(j\omega)$, at the output of the equalizer is substantially the same as the transmitted signal $T(j\omega)$.

FIG. 2, now to be considered, shows an adaptive equalizer in accordance with the present invention comprising N feed-forward stages. Each stage comprises: a first parallel wave path 1-1, 1-2 ... 1-N including a first adjustable attenuator 20-1, 20-2 ... 20-N such as, for example, a PIN diode; wavepath 2-1, 2-2 ... 2-N including a second adjustable attenuator 21-1, 21-2 ... 21-N, and an adjustable delay means 22-1, 22-2 ... 22-N; and means 23-1, 23-2 ... 23-N for combining the signals in the two wavepaths. The combined signal in each of the first N-1 stages is coupled to the next stage in the equalizer. The combined signal from the last stage, $E_N(j\omega)$, is the equalizer output signal.

It should be noted that the first stage differs from the other N-1 stages in that the signal combiner 23-1 forms a difference signal whereas combiners 23-2 ... 23-N form sum signals. The reason for this difference will become apparent in the discussion that follows.

With an input signal $R(j\omega)$, the output signal $E_1(j\omega)$ of the first equalizer stage is the difference in the signals in the two paths 1-1 and 2-1 given by $$E_1(j\omega) = b_1 R(j\omega) - a_1 e^{-j\omega T_1} R(j\omega) \tag{2}$$

where $a_1$ and $b_1$ are the attenuator gain factors for the respective wavepaths.

Substituting from equation (1) for $R(j\omega)$, one obtains $$E_1(j\omega) = a b_1 (1 - K e^{-j\omega T})(1 + b e^{-j\omega \tau}) T(j\omega), \tag{3}$$

where $$K = a_1/b_1$$

and $$T = T_1.$$

Expanding (3) yields $$E_1(j\omega) = a b_1(1 + b e^{-j\omega \tau} - K e^{-j\omega T} - K b e^{-j\omega(T+\tau)}) T(j\omega) \tag{4}$$

Making $K = b$ and $T = \tau$, equation (4) reduces to $$E_1(j\omega) = a b_1 (1 - K^2 e^{-j\omega 2T}) T(j\omega) \tag{5}$$

This simplification is made possible by using a differencing combiner in stage 1. Having introduced the minus sign in equation (5) by this means, the remaining combiners are summing combiners.

In a similar manner, the output from stage 2 can be written $$E_2(j\omega) = (b_2 + a_2 e^{-j\omega T_2}) E_1(j\omega). \tag{6}$$

Substituting from equation (5) and combining terms, $E_2(j\omega)$ reduces to $$E_2(j\omega) = a b_1 b_2 (1 - K^4 e^{-j\omega 4T}) T(j\omega) \tag{7}$$

where $$K^2 = b^2 = a_2/b_2$$

and $$T_2 = 2T = 2\tau.$$

In general, one can write for the output of the $N^{th}$ stage $$E_N(j\omega) = aC[1 - K^{(2N)} e^{-j\omega 2NT}] T(j\omega) \tag{8}$$

provided $$a_i/b_i = (a_1/b_1)^{2(i-1)} = K^{2(i-1)} = b^{2(i-1)} \tag{9}$$

and $$T_i = 2^{(i-1)} T_1 \tag{10}$$

for $$1 \leq i \leq N.$$

where
$C = b_1 b_2 \ldots b_N$ is frequency independent.

For a minimum phase fade, $b = K < 1$, the term $K^{2N}$ becomes very small and equation (8) reduces to $$E_N(j\omega) = aCT(j\omega). \tag{11}$$

Since a and C are frequency independent parameters, the equalizer output signal, as given by equation (11), is simply a scaled (i.e., totally equalized) replica of the transmitted signal. This is the equivalent of a flat fade which can be compensated by the AGC system in the receiver.

For a nonminimum phase fade, $b = K > 1$, the term $K^{2N}$ is much greater than unity and equation (8) reduces to $$E_N(j\omega) = -aCK^{2N} e^{-j\omega 2NT} T(j\omega) \tag{12}$$

where $aCK^{2N}$ is a frequency independent term and $e^{-j\omega 2NT}$ is a linear phase term. Thus, for both the minimum and nonminimum phase cases, the equalizer eliminates the frequency selective nature of the transmission medium due to multipath transmission.

The number of stages included in the equalizer will depend on the system requirements. For example, let us assume a 40 dB, minimum phase selective fade. This may be generated when $a = 1.0$ and $b = 0.99$. The number of stages required is given by $$K^{2N} << 1.$$

Assuming $K^{2N} \leq 0.1$, and further noting that $K = b = 0.99$, one obtains that $$N \geq 7.84.$$

This implies a minimum of 8 stages.

The above example represents a worst case condition in the sense that the fade is assumed to be due exclusively to destructive interference of the two signal components when a=1 and b=0.99. However, a 40 dB fade is obtained for other values of medium parameters such as a=0.1 and b=0.9. For this condition, one obtains a 40 dB fade which is composed of a 20 dB flat fade and a selective fade of only 20 dB. For this condition, a 5 stage equalizer will yield the same degree of equalization as the 8 stages operating on a 40 dB selective fade. In an article entitled "A New Selective Fading Model: Application to Propagation Data," by W. D. Rummler, published in the May-June 1979 issue of the *The Bell System Technical Journal*, it is shown that on the average most fades include components of both flat and selective fades. Since flat fades can be compensated by the AGC action of the receiver, a feed-forward equalizer with a relatively small number (i.e., 5 or 6) of stages will be adequate to provide substantial outage reduction. In the same *Bell System Technical Journal* article W. D. Rummler shows that the channel delay $\tau$ can be treated as a constant, set at 6.3 nsec. However, other values for $\tau$ are also possible.

As indicated hereinabove, signal fading is a dynamic phenomenon and, hence, means must be provided for sensing changing signal conditions and for readjusting the equalizer in response to these changes. FIG. 3, now to be considered, illustrates, in block diagram, one embodiment of an arrangement for adjusting the equalizer parameters so as to accommodate such changing signal conditions when the equalizer is used to compensate for multipath fades. Since the channel delay $\tau$ can be treated as a constant, the control algorithm can be simplified by fixing the delay elements 22-1, 22-2 . . . 22-N. As a result, the gain bump of the equalizer occurs at a fixed frequency. This means that the location (i.e., frequency) of the fade notch must be detected and then translated so that in all cases it is aligned with the equalizer gain bump frequency. Following this, the gain of the equalizer is adjusted such that it equals the magnitude of the selective fade portion of the fade. Accordingly, the equalizer 11 is located between an input frequency converter 43 and an output frequency converter 44 which serve to translate the signal fade notch frequency into coincidence with the equalizer bump frequency, and then back to within the IF band. Both converters receive a signal from a common voltage controlled local oscillator 45 whose output frequency is determined by a frequency error signal derived from a controller 50.

If the fade notch is not exactly aligned with the equalizer gain bump, the equalized spectrum will display an "S" shaped amplitude response. To detect this, the spectrum at the output of the equalizer is examined at frequencies surrounding the equalizer bump frequency $f_e$. This is done by the two bandpass filters 39 and 40 which are tuned to frequencies $f_{e+}$ and $f_{e-}$, respectively, where $f_{e-}$ is a frequency below $f_e$, and $f_{e+}$ is a frequency above $f_e$. The filter outputs are coupled to the controller which develops the appropriate compensating error signal for changing the oscillator frequency.

The location of the fade notch is determined by sampling the input signal at three frequencies, $f_1$, $f_2$ and $f_3$, within the band of interest, where $f_2$ is at band center and $f_1$ and $f_3$ are advantageously as close to the band edges as possible. Sampling is accomplished by feeding a portion of the input signal to each of three bandpass filters 32, 33 and 34 tuned, respectively, to $f_1$, $f_2$ and $f_3$. The three filter outputs are coupled to controller 50.

A second determination to be made is whether or not there is a minimum or nonminimum phase fade. This information is required by the controller in order to set the relative gain factors $\{a_i\}$ and $\{b_i\}$ of the equalizer stages. During a minimum phase fade, $\{a_i\}$ is advantageously set equal to unity, with $\{b_i\}$ adjusted to values less than one. For a nonminimum phase fade, $\{b_i\}$ is advantageously set equal to unity with $\{a_i\}$ made less than one. The information required to make this determination is obtained by sampling the signal at the input to the equalizer. The determination is made in a phase analyzer 51, which communicates the results of the determination to controller 50.

Finally, the three sampled frequencies $f_1$, $f_2$ and $f_3$ are compared at the output of the output converter and the information thus derived is used to update the gain coefficients $\{a_i\}$ and $\{b_i\}$. The output signal is sampled by bandpass filters 36, 37 and 38, and the sampled signals, thus obtained, are coupled to the controller.

In the discussion that follows, various illustrative circuits for providing the above-indicated control functions will be described. These circuits, collectively, comprise what has been referred to as the controller.

1. Fade Notch Detector and Oscillator Control Voltage Generator.

Figure 4:
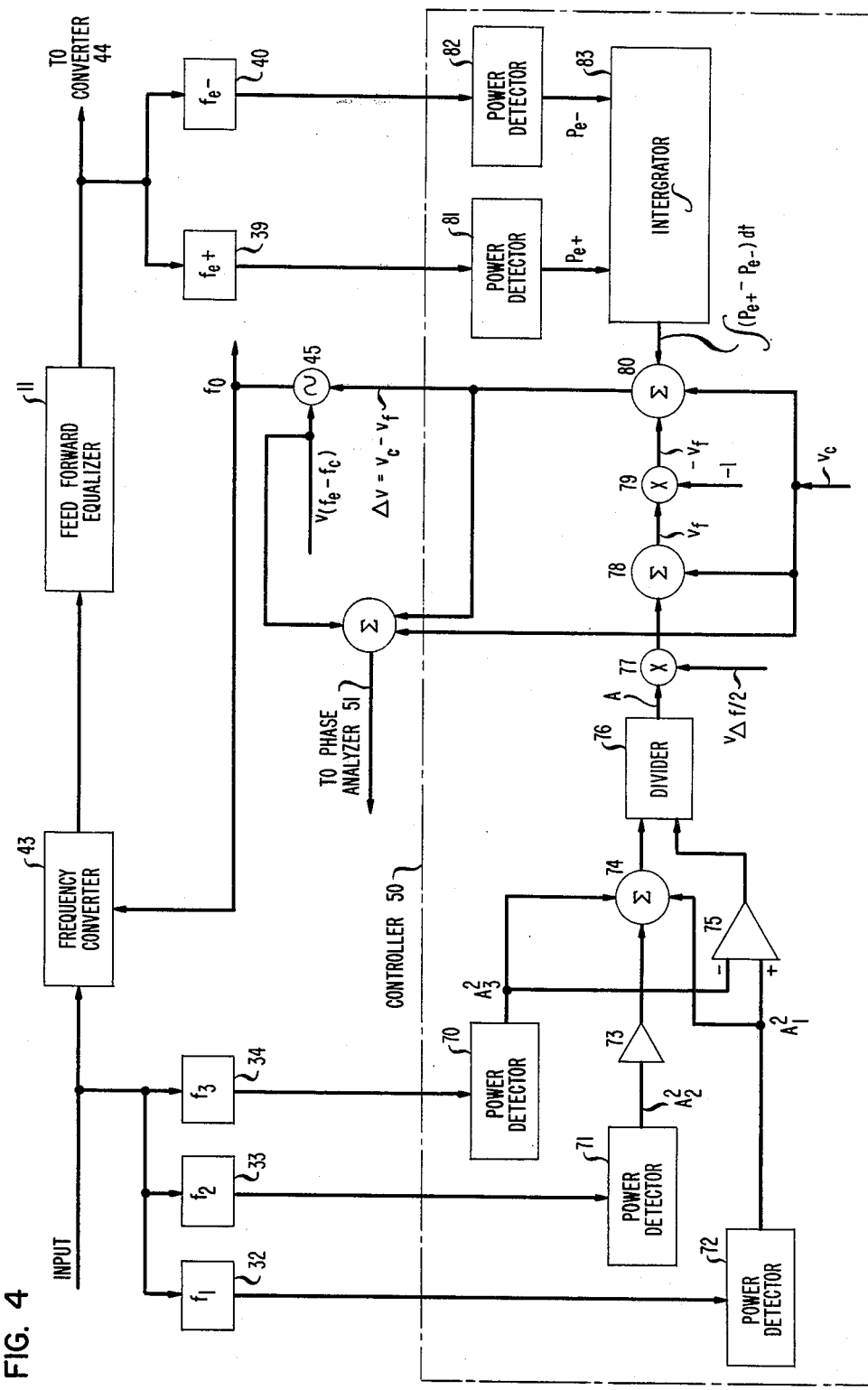
FIG. 4 shows an illustrative embodiment of a fade notch detector and oscillator control voltage generator.

FIG. 4 shows, in block diagram, the portion of the controller 50 concerned with determining the fade notch frequency, $f_n$, and adjusting the frequency of the local oscillator 45 so as to shift the fade notch into frequency coincidence with the equalizer bump frequency, $f_e$.

As indicated hereinabove, to determine the fade notch frequency, the spectral power of the input signal is measured at three points. It can be shown that, based upon these measurements, the fade notch frequency can be approximated by $$f_n \approx f_c + \frac{\Delta f}{2} \frac{A_1^2 - A_3^2}{A_1^2 + A_3^2 - 2A_2^2}, \qquad (13)$$

where $f_c$ is the frequency at band center; and $A_1^2$, $A_2^2$ and $A_3^2$ are proportional to the power in the spectral samples centered at frequencies $f_1 = f_c - \Delta f$, $f_2 = f_c$, and $f_3 = f_c + \Delta f$, respectively.

It is the function of the fade notch detector and oscillator control voltage generator to generate a control voltage that will produce frequency changes in oscillator 45 that are proportional to $f_n$. Accordingly, the outputs from bandpass filters 32, 33 and 34 are coupled, respectively, to power detectors 72, 71 and 70 whose outputs are $A_1^2$, $A_2^2$ and $A_3^2$. Signals $A_1^2$ and $A_3^2$ are combined in differential amplifier 75 to produce signal $A_1^2 - A_3^2$. Signal $A_2^2$ is amplified and inverted in amplifier 73 to produce signal $-2A_2^2$, which is then combined with signals $A_1^2$ and $A_3^2$ in summing network 74 to produce signal $A_1^2 + A_3^2 - 2A_2^2$. The output of amplifier 75 is then divided in divider 76 by the output from summing network 74 to produce signal component A given by $$A = \frac{A_1^2 - A_3^2}{A_1^2 + A_3^2 - 2A_2^2} \qquad (14)$$

Signal component A is then multiplied in multiplier 77 by a voltage $v_{\Delta f/2}$ that is proportional to $\Delta f/2$, and the resulting product added, in a summing network 78, to a second voltage $v_c$ that is proportional to $f_c$. The resulting signal, $v_f$, at the output of summing network 78 is then $$v_f = v_c + A v_{\Delta f/2} \tag{15}$$

where $v_f$ is proportional to $f_n$, as given by equation (13).

In the initial adjustment of oscillator 45, a voltage $v_{(f_e - f_c)}$ is applied to the oscillator such that the local oscillator frequency, $f_o$, applied to the frequency converters 43 and 44 is $$f_o = f_e - f_c, \tag{16}$$

where $f_e$ is the equalizer bump frequency;
and
$f_c$ is the frequency at band center.

The function of the oscillator control voltage is to shift that frequency an amount $f_c - f_n$, so that the fade notch, rather than band center, is in frequency coincidence with the equalizer bump frequency. Accordingly, an incremental voltage $\Delta v$ proportonal to $f_c - f_n$ is required. (For purposes of this discussion, it is assumed that the oscillator output frequency is proportional to the control voltage over the range of interest.) This control voltage is obtained by multiplying $v_f$ by $-1$ in a multiplier 79, and adding voltage $v_c$ to the result in summing network 80. The resulting signal $\Delta v$ is then given by $$\Delta v = v_c - v_f, \tag{17}$$

which is proportional to $f_c - f_n$ as required.

In addition to this primary frequency control, there is a second oscillator control contribution made by sensing the spectral power at two frequencies $f_{e+}$ and $f_{e-}$ about the equalizer bump frequency $f_e$. Thus, in FIG. 4, the outputs from bandpass filters 39 and 40 are coupled to a pair of power detectors 81 and 82. The outputs $P_{e+}$ and $P_{e-}$ from the latter are coupled, in turn, to an integrator 83 which generates a signal that is proportional to the difference in the signal power, integrated over a period of time. This integrated signal is applied to summing network 80 and serves as a vernier adjustment of the oscillator control voltage $\Delta v$.

2. Phase Analyzer

Figure 5:
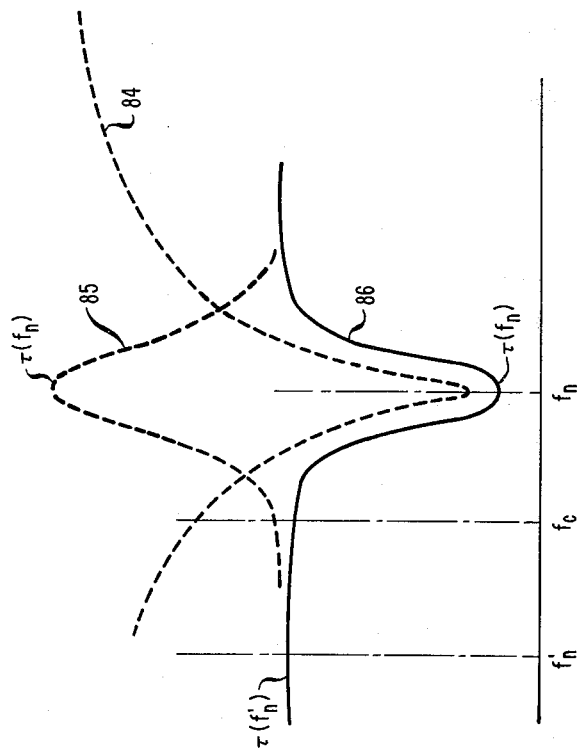
FIG. 5, included for purposes of explanation, shows the delay response of a frequency selective fade for the minimum and nonminimum phase cases.

The relative adjustment of the gain factors $a_i$ and $b_i$ where $i = 1, 2, \ldots, N$ in the respective equalizer stages is determined, in the first instance, by the phase characteristic of the fade. If the fade is a minimum phase fade, $a_i$ is made equal to unity and $b_i$ is made less than unity for all i. Conversely, for the nonminimum phase fade, $b_i$ is made equal to unity and $a_i$ is made less than unity for all i. Accordingly, means, in the form of a phase analyzer 51, are provided for examining the signal and making the necessary determination. In this regard, it can be shown that the delay responses of minimum and nonminimum phase fades vary in opposite directions as a function of frequency. For example, consider a fade having the amplitude response given by curve 84 in FIG. 5. If it is a minimum phase fade, the delay response is a maximum at the notch frequency, decreasing symmetrically as a function of frequency, as shown by curve 85. If, on the other hand, it is a nonminimum phase fade, the delay response is a minimum at the notch frequency, increasing as a function of frequency, as illustrated by curve 86. Thus, if the delay $\tau(f_n)$ at the fade notch frequency $f_n$ is compared with the delay $\tau(f_n')$ at a frequency $f_n'$, symmetry located on the other side of the band center frequency, $f_c$, the nature of the fade can be determined. That is, if $$\tau(f_n) > \tau(f_n')$$

it is a minimum phase fade, whereas if $$\tau(f_n) < \tau(f_n')$$

it is a nonminimum phase fade.

Figure 6:
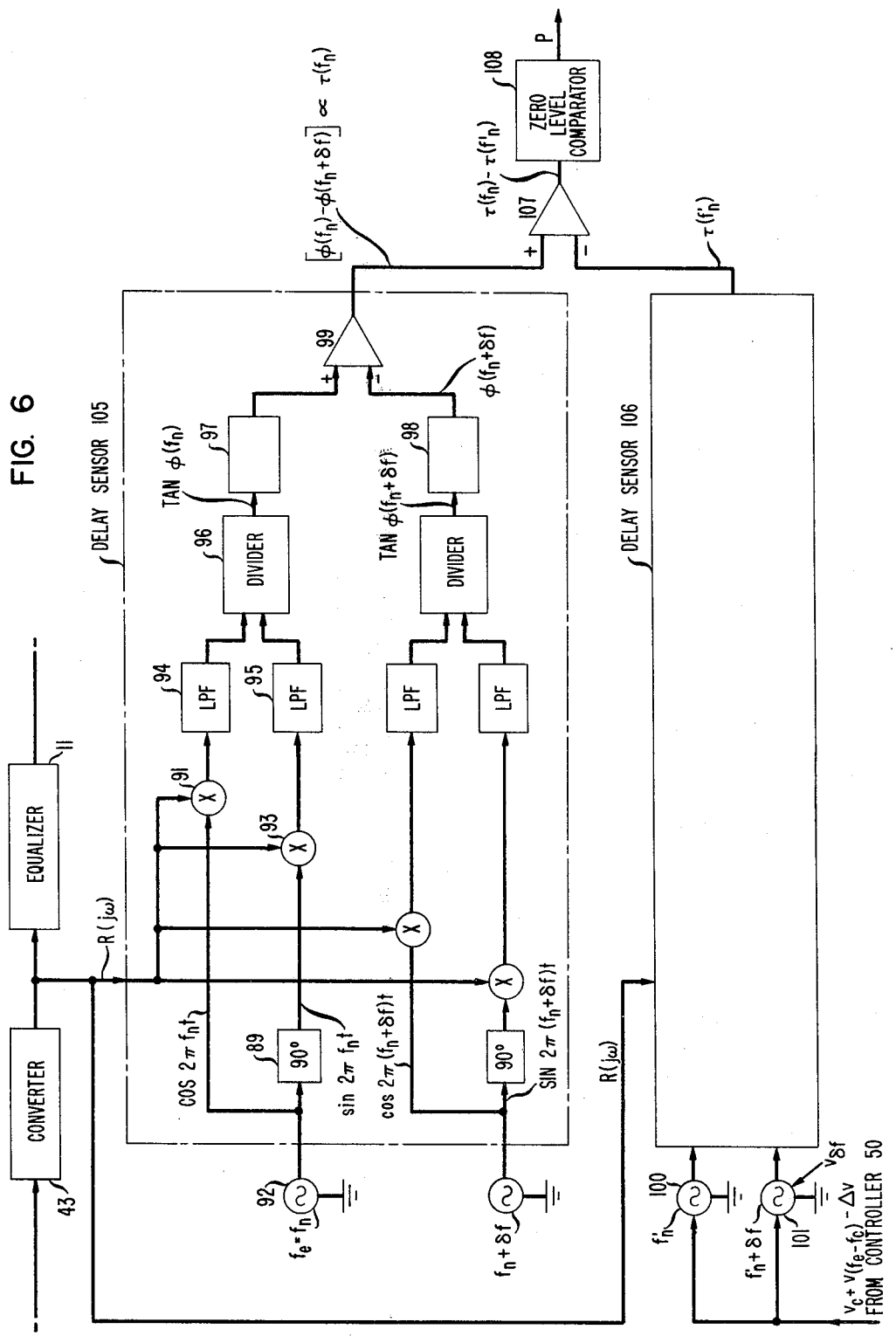
FIG. 6 shows an illustrative embodiment of a phase analyzer.

Thus, to determine the delays at frequencies $f_n$ and $f_n'$, the phase analyzer comprises two delay sensors 105 and 106, as illustrated in FIG. 6. Noting that the delay is equal to the derivative of the phase angle with respect to frequency, delay sensor 105 evaluates the phase angle at the fade notch frequency $f_n$ and at a frequency $f_n + \delta f$, where $\delta f$ is relatively small, and then takes their difference to obtain a measure of the delay. It then does the same thing at $f_n'$ and compares the two delays.

To determine $\phi(f_n)$, a component of the signal $R(j\omega)$ is multiplied, in a mixer 91 located in delay sensor 105, by a signal $\cos 2\pi f_n t$ derived from a local oscillator 92. It will be noted that the fade notch frequency is shifted to coincide with the bump frequency $f_e$ of the equalizer. Hence, oscillator 92 is simply tuned to $f_e$. Signal $R(j\omega)$ is also multiplied in a mixer 93 by a signal $\sin 2\pi f_n t$, obtained by passing the signal from oscillator 92 through a 90 degree phase shifter 89. The multiplier outputs are passed through lowpass filters (LPF) 94 and 95 (i.e., with cut-off frequency at 1 Hz) and then divided in divider 96 to form a signal proportional to $\tan \phi(f_n)$. The latter is then coupled to a network 97 whose output is proportional to the arctangent of its output signal.

This process is also followed at a frequency $f_n \pm \delta f$, to produce at the output of a second network 98 a second signal proportional to $\phi(f_n \pm \delta f)$. The signals from the two networks 97 and 98 are coupled to differential amplifier 99 to form the difference signal $\phi(f_n) - \phi(f_n + \delta f)$ which is proportional to the delay $\tau(f_n)$ at $f_n$.

An identical procedure is followed at frequencies $f_n'$ and $f_n' \pm \delta f$ in delay sensor 106. While the frequency of the notch is known by virtue of its coincidence with the equalizer frequency $f_e$, the frequency $f_n'$ is a variable. Accordingly, the oscillator control signals $V_{(f_e - f_c)}$, $\Delta V$, $V_c$, generated in the controller are used to control the frequencies of a second pair of oscillators 100 and 101. Oscillator 101 has an additional vernier control voltage $V_{\delta f}$ proportional to $\delta f$. In all other respects, the operation of the second delay sensor 106 is as described hereinabove. The output signal $\tau(f_n')$, which is proportional to the delay at frequency $f_n'$ is coupled along with the output signal $\tau(f_n)$ from sensor 105 to a differential amplifier 107 which forms a difference signal at its output. If the output signal is positive, i.e., $\tau(f_n) > \tau(f_n')$, the fade is a minimum phase fade, and a signal P equal to logic level "1" is produced at the output of a zero level comparator 108. If, on the other hand, the difference signal is negative, the fade is a nonminimum phase fade and a logic level "0" signal is produced.

3. Equalizer Gain Adjustment

The gain adjustments, $a_i$ and $b_i$, in each of the equalizer stages are made by sampling both the equalizer input signal and the equalizer output signal at three frequencies across the band of interest. The reasons for sampling the input signal are (1) to determine whether or not a multipath, frequency selective fade has occurred, and (2) to determine what side of band center the fade notch is located. The output signal is sampled so as to determine the proper gain settings.

Figure 7:
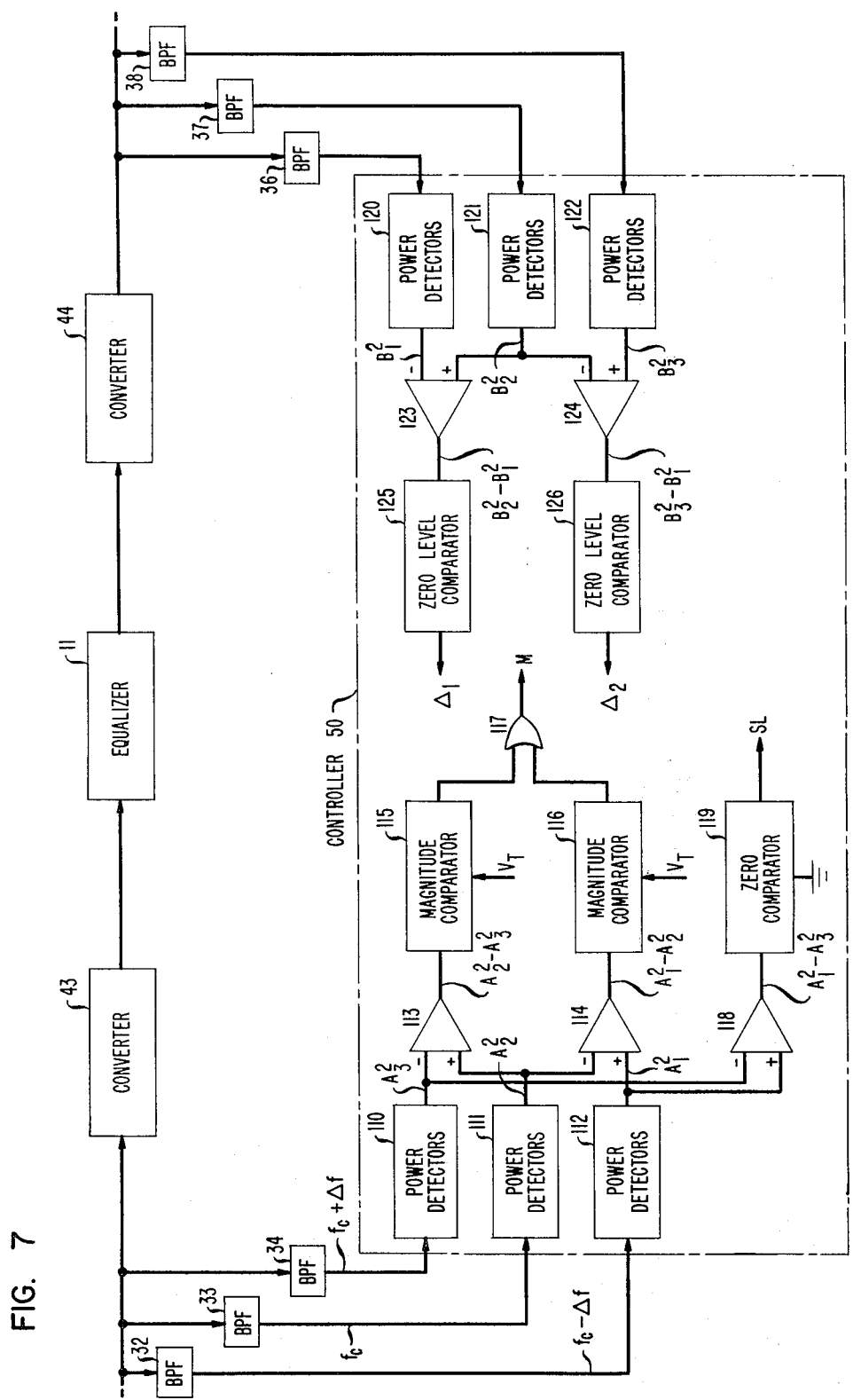
FIG. 7 shows an illustrative embodiment of an equalizer gain adjustment circuit.

FIG. 7, now to be considered, shows that portion of the controller 50 relating to the equalizer gain adjustments. At the input end of converter 43, the input signal is sampled at three frequencies within the band of interest by means of bandpass filters 32, 33 and 34 whose center frequencies are $f_c - \Delta f$, $f_c$ and $f_c + \Delta f$, where $f_c$ is band center, and $f_c \pm \Delta f$ are close to the band edges. The filter outputs are coupled to power detectors 110, 111 and 112 whose outputs are $A_1^2$, $a_2^2$ and $A_3^2$.

To determine whether or not a multipath fade has occurred, difference signals $A_2^2 - A_3^2$ and $A_1^2 - A_2^2$ are formed in differential amplifiers 113 and 114, and these differences compared to a specified threshold signal $V_T$ in magnitude comparators 115 and 116.

Figure 8:
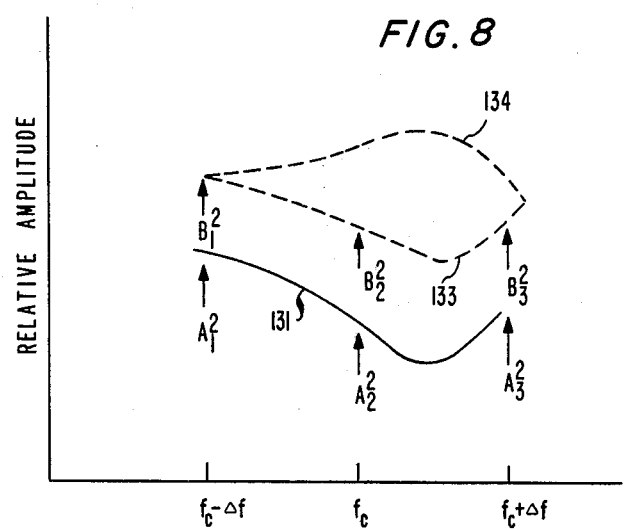
FIGS. 8 and 9, included for purposes of explanation, show the equalizer input signal and the equalizer output signal for various gain adjustments.
Figure 9:
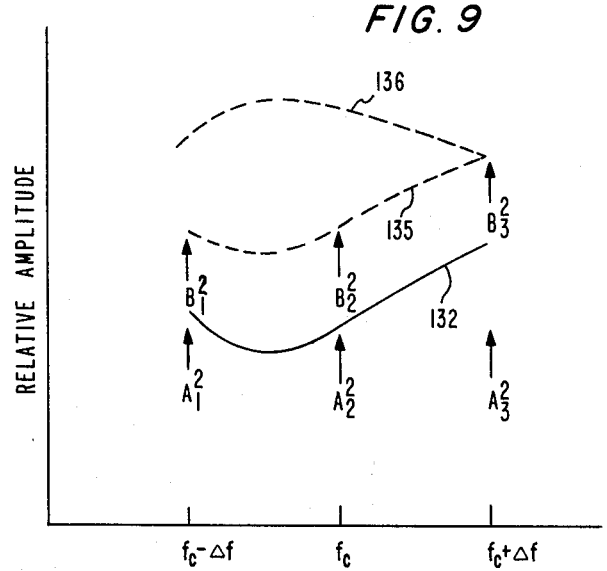

The significance of the difference signals can be appreciated by referring to FIGS. 8 and 9 which show the amplitude variations across the signal band for two different fade conditions. If, as illustrated by curve 131 in FIG. 8 or curve 135 in FIG. 9, the fade notch falls above $f_c$ (i.e., between $f_c$ and $f_c + \Delta f$, or above $f_c + \Delta f$), $A_1^2$ will typically be much larger than $A_2^2$ so that the magnitude of $A_1^2 - A_2^2$ will exceed the threshold level $V_T$. If the fade notch falls below $f_c$ (i.e., between $f_c$ and $f_c - \Delta f$, or below $f_c - \Delta f$) as illustrated by curve 132 in FIG. 9, the magnitude of $A_3^2 - A_2^2$ will exceed $V_T$. Finally, if the fade notch falls near $f_c$, the magnitudes of both difference signals will exceed $V_T$. In all cases, this indicates a multipath fade. Accordingly, all outputs from comparators 115 and 116 are coupled to an OR gate 117 whose output M is level "1" if either of the three above-noted conditions prevails.

If, on the other hand, the amplitude variations across the band are such that the difference signals do not exceed the specified threshold $V_T$, the output M from gate 117 is level "0", indicating the absence of a multipath fade, or a fade that is shallow enough to be ignored.

Having established the presence of a multipath fade, we next wish to locate its position relative to band center. To do this, a difference signal $A_1^2 - A_3^2$ is formed in differential amplifier 118 and this difference compared to a zero level reference in comparator 119. If $A_1^2$ is greater than $A_3^2$, as in FIG. 8, a comparator output signal SL of level "1" is produced. If, on the other hand, $A_1^2 < A_3^2$, as in FIG. 9, a comparator output signal SL of level "0" is produced.

At the equalizer output, the signal is again sampled at frequencies $f_c$ and $f_c \pm \Delta f$, by means of bandpass filters 36, 37 and 38, and the samples detected in power detectors 120, 121 and 122 to produce signals $B_1^2$, $B_2^2$ and $B_3^2$. The object here is to examine these three signal components and to determine whether the signal has been undercompensated or overcompensated. When properly adjusted, the equalizer output signal will be substantially flat across the band. If, however, the signal is undercompensated, it will have an amplitude distribution as indicated by curve 133 in FIG. 8 or curve 136 in FIG. 9. If it is overcompensated, it will have the shape given by curve 134 in FIG. 8, or curve 136 in FIG. 9. Accordingly, to determine the output signal state, the midband signal $B_2^2$ is compared with the edgeband signal, farthest from the fade notch. With the fade notch located above $f_c$, $B_2^2$ is compared with $B_1^2$. Thus, the difference between signals $B_1^2$ and $B_2^2$ is formed in a differential amplifier 123 and the resulting difference signal is compared to a zero level reference in a zero level comparator 125. If $B_2^2 < B_1^2$, the comparator output signal $\Delta_1$ is level "0", indicating undercompensation, in which case the gain factors, $a_i$, of the variable attenuators are increased for the minimum phase case, whereas the gain factors, $b_i$, are increased for the nonminimum phase case. If, on the other hand $B_2^2 < B_1^2$, $\Delta_1 =$ "1", in which case $a_i$ is decreased for the minimum phase case, and $b_i$ decreased for the nonminimum phase case.

When the fade notch is below band center (SL = "0"), as shown in FIG. 9, $B_2^2$ is compared with $B_3^2$. Accordingly, a difference signal $B_3^2 - B_2^2$ is formed in difference amplifier 124, and this difference compared with zero level in a zero level comparator 126. Depending upon the sign of the difference, output signal $\Delta_2$ will be either at level "0" or level "1", indicating the required gain adjustment. A summary of the possible states, and the indicated gain adjustments are given hereinbelow in Table I.

TABLE I

|  |  |  | Minimum Phase Fade |  | Nonminimum Phase Fade |  |
|---|---|---|---|---|---|---|
| SL | $\Delta_1$ | $\Delta_2$ | $a_i$ | $b_i$ | $a_i$ | $b_i$ |
| 1 | 0 |  | Increase | 1 | 1 | Increase |
| 1 | 1 |  | Decrease | 1 | 1 | Decrease |
| 0 |  | 0 | Decrease | 1 | 1 | Decrease |
| 0 |  | 1 | Increase | 1 | 1 | Increase |

Having made the various measurements, and generated the several control signals M, SL, $\Delta_1$, $\Delta_2$ and P, the actual adjustments of the equalizer parameters are under the control of a microprocessor, such as the BELLMAC 8 (BELLMAC is a registered trademark of Western Electric) microprocessor, or its equivalent. Recalling the earlier discussion, that all of the gain factors are related as given by equation (9), the algorithm for making the gain adjustments is relatively simple.

Figure 10:
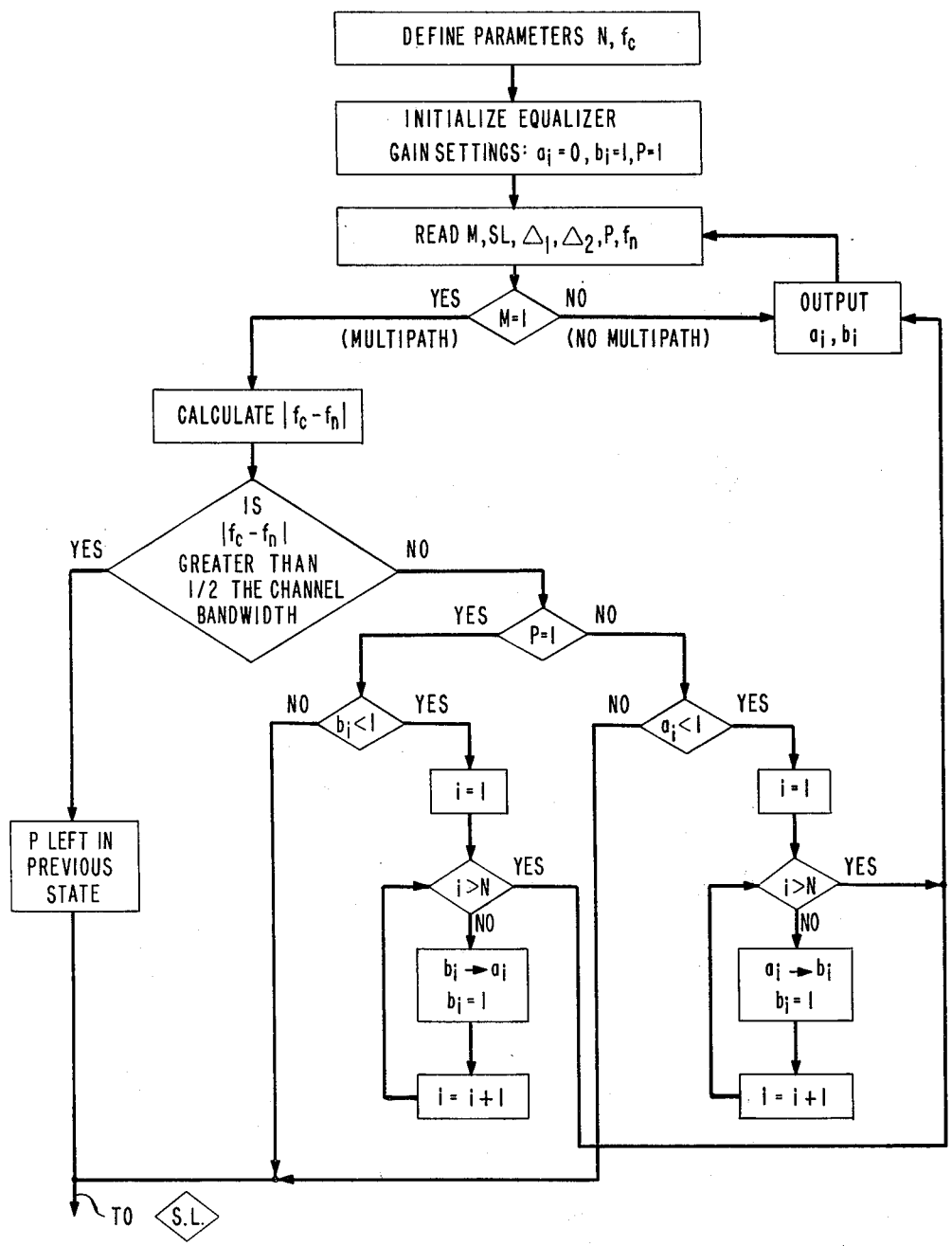
FIGS. 10 and 11 show a flow chart for adjusting the equalizer gain parameters.
Figure 11:
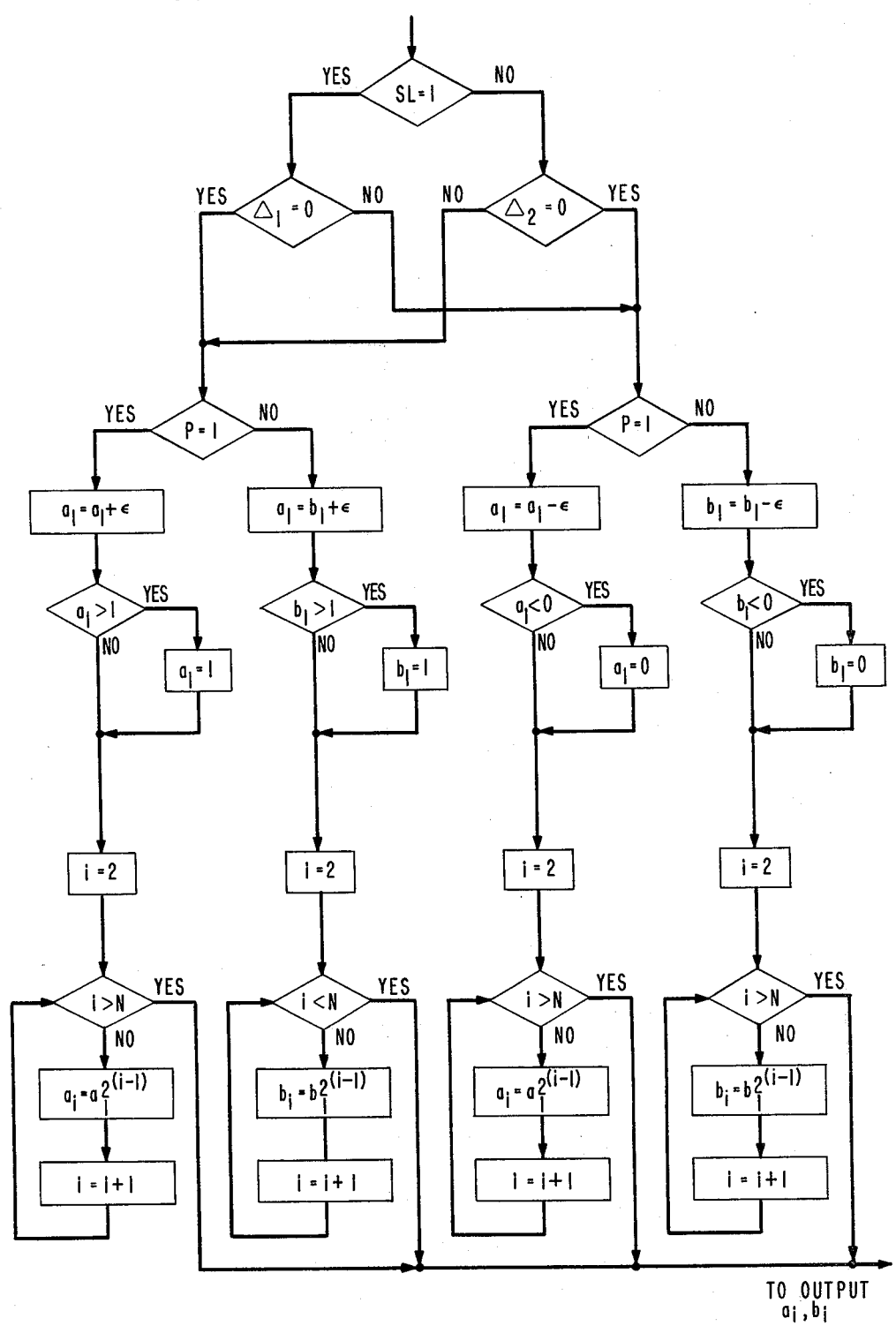

FIGS. 10 and 11 outline the above-described procedure for adjusting the equalizer gain parameters $a_i$ and $b_i$. Having defined the number of stages N and the band center frequency $f_c$, the system is initialized by setting $a_i = 0$, $b_i = 1$ for all $i = 1, 2, \ldots, N$ and $P = 1$. These are the gain settings when there is no multipath transmission and for which the equalizer is transparent. The microprocessor then reads the control signals M, SL, $\Delta_1$, $\Delta_2$, $f_n$, and P whose meanings are summarized hereinbelow.

| Control Signal Summary | |
|---|---|
| M = 1 | indicates presence of frequency-selective, multipath fade |
| M = 0 | indicates absence of multipath fade |
| Sl = 0 | indicates fade notch frequency is above band center |
| SL = 1 | indicates fade notch frequency is below band center |
| $\Delta_1 = 0$ | indicates equalized signal is undercompensated while SL = 1 |
| $\Delta_1 = 1$ | indicates equalized signal is overcompensated while SL = 1 |
| $\Delta_2 = 0$ | indicates equalized signal is overcompensated while SL = 0 |
| $\Delta_2 = 1$ | indicates equalized signal is |

-continued

Control Signal Summary

| | |
|---|---|
| | undercompensated while SL = 0 |
| p = 1 | indicates minimum phase fade |
| p = 0 | indicates nonminimum phase fade |
| $f_n$ | fade notch frequency |

If M is not "1", there is no multipath fade and $a_i$ and $b_i$ are left in their previous states. $b_i$ is unity and $a_i$ is zero for all i. If, on the other hand, M=1, indicating the presence of a multipath fade, the location of the fade is examined by calculating $f_c - f_n$. If this value is greater than one-half the channel bandwidth, the fade is out of band. For this case, the nature of the fade (i.e., minimum or nonminimum phase) is irrelvant so that the P setting remains in its previous state. Depending upon the slope SL of the inband amplitude dispersion, and the degree of over or under compensation, as indicated by $\Delta_1$ and $\Delta_2$, the gain factors $a_i$ and $b_i$ are incremented and/or decremented, depending upon the nature of the fade, as indicated by P.

If the fade notch $f_n$ falls within the band (i.e., $f_o - f_n$ is less than one-half the channel bandwidth) the phase characteristic of the fade is examined. If, for example, P is determined to be "1", indicating a minimum phase fade, the $b_i$ settings are examined. It will be recalled that for P=1, $b_i$ is set to unity for all i=1, 2, ..., N. Accordingly, if $b_1$ is not less than unity, no immediate readjustment of the gain settings is called for, and the operational flow is to reexamine the $a_i$ settings by rechecking the slope SL and degree of compensation, $\Delta_1$, $\Delta_2$.

If, however, it is found that $b_i$ is less than unity, all $b_i$ gain settings are transferred to $a_i$, and $b_i$ is set equal to unity. The new settings are then outputted.

A similar set of adjustments are made for P=0 except, in this case, $a_i$ is set equal to unity and $b_i$ is appropriately adjusted.

Figure 12:
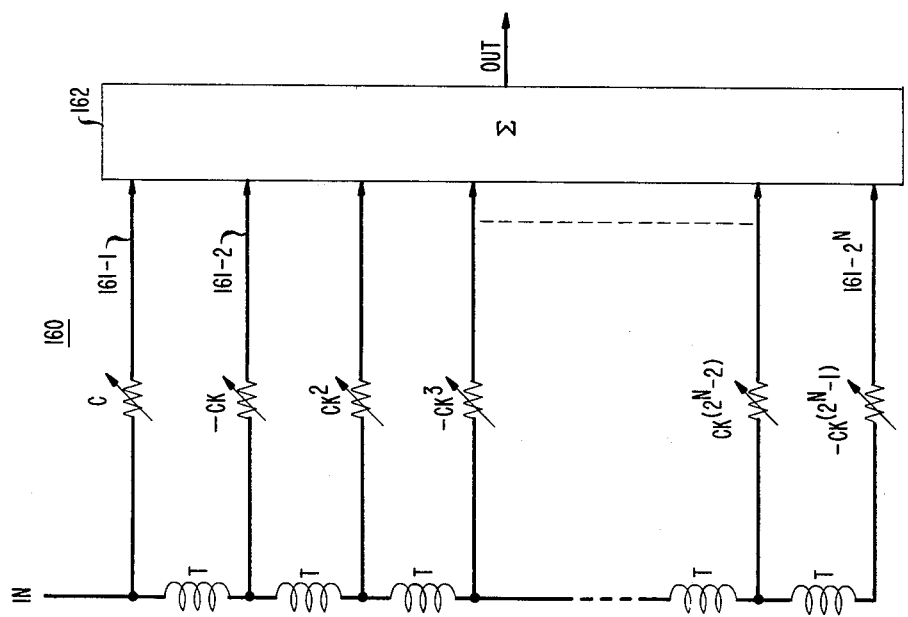
FIG. 12 shows an alternative, transversal filter equivalent of the feed-forward equalizer of FIG. 2.

FIG. 12 shows an alternative, transversal filter equivalent of the N-stage feed-forward equalizer of FIG. 2. This embodiment comprises a delay line 160 with $2^N$ taps, where the tap spacing is T. Each of the $2^N$ taps 161-1, 161-2 ... 161-$2^{N+}$ is coupled to a summing network 162 where the $2^N$ signal components, thus obtained, are summed to produce the equalized output signal.

Referring to the fed-forward embodiment of FIG. 2, the equalizer transfer function $H(j\omega)$ can be expressed as $$H(j\omega) = b_1 b_2 \ldots b_N \left[1 - \frac{a_1}{b_1} e^{-j\omega T_1}\right] \left[1 + \frac{a_2}{b_2} e^{-j\omega T_2}\right] \ldots \quad (18)$$

$$\left[1 + \frac{a_N}{b_N} e^{-j\omega T_N}\right]$$

If, as before, we make $$C = b_1 b_2 \ldots b_N,$$

$$K^{2(i-1)} = \frac{a_i}{b_i} = \left(\frac{a_1}{b_1}\right)^{2(i-1)} \quad (19)$$

and $T_i = 2^{(i-1)} T_1 = 2^{(i-1)} T$ where $1 < i < N$ (20)

$$H(j\omega) = C \sum_{i=0}^{i=(2^N-1)} (-1)^i K^i e^{j\omega i T}. \quad (21)$$

Equation (21), however, is also the transfer function of a $2^N$ tap transversal filter with tap spacing T, and tap weights $C(-1)^i K^i$ for $0 \leq i \leq 2^N - 1$. Inasmuch as the equalizer embodiments of FIGS. 2 and 12 are equivalent, the control algorithm described hereinabove with respect to the feed-forward equalizer is equally applicable for controlling a transversal filter equalizer for minimizing linear distortion caused by multipath fading.

It should be noted that the transversal filter equalizer operates on a modulated carrier signal (either RF or IF), and not on a baseband (i.e., demodulated) signal, which is typically the manner in which conventional transversal filters are used.

What is claimed is:

1. An equalizer (11) comprising a plurality of feed-forward stages (1, 2, ... N) connected in cascade:
   each stage comprising:
   a first parallel wavepath (1-1, 1-2, ... 1-N) including a first variable attenuator (20-1, 20-2, ... 20-N);
   a second parallel wavepath (2-1, 2-2, ... 2-N) including a second variable attenuator (21-1, 21-2, ... 21-N), and delay means (22-1, 22-2, ... 22-N);
   means (23-1, 23-2, ... 23-(N-1)) for combining the signals in the parallel wavepaths of each of the first (N-1) stages and for coupling the combined signals to the next stage of said equalizer;
   and means (23-N) for combining the signals in the parallel wavepaths of the $N^{th}$ equalizer stage and for coupling the combined signals to the equalizer output terminal.

2. The equalizer according to claim 1 wherein:
   the combining means (23-1) of the first stage is a differencing circuit;
   and the combining means of each of the other (N-1) stages (23-2, ... 23-N) is a summing circuit.

3. The equalizer according to claim 1 wherein the delay, $T_i$ of the delay means in each of said stages is a constant given by $$T_i = 2^{(i-1)} T_1$$

where $$1 \leq i \leq N$$

and $T_1$ is the delay in the first stage.

4. The equalizer according to claim 3 wherein:
   the first attenuator in each of said stages has a gain factor $b_i$;
   the second attenuator in each of said stages has a gain factor $a_i$;
   and wherein $$a_i / b_i = (a_1 / b_1)^{2(i-1)}$$

where $$1 \leq i \leq N$$

and $a_1$ and $b_1$ are the attenuator gain factor of the first equalizer stage.

5. An adaptive, frequency-selective fade equalizer arrangement comprising:
   an equalizer in accordance with claim 4:
   a phase analyzer (50) for determining the phase characteristic of the fade;
   means for determining the fade notch frequency and for shifting said fade notch into frequency coincidence with the equalizer gain bump frequency defined by the delay $T_1$;
   and means for adjusting the gain factors $a_i$ and $b_i$ of the equalizer stages to minimize the inband amplitude dispersion produced by said fade.

6. A transversal filter equalizer having a transfer function $H(j\omega)$ given by $$H(j\omega) = b_1 b_2 \ldots b_N \left[ 1 - \frac{a_1}{b_1} e^{-j\omega T_1} \right] \left[ 1 + \frac{a_2}{b_2} e^{-j\omega T_2} \right] \ldots \left[ 1 + \frac{a_N}{b_N} e^{-j\omega T_N} \right]$$

comprising:
   a delay line having $2^N$ taps with tap spacing T and tap weights $C(-1)^i K^i$, where:
   $a_1, a_2 \ldots a_n$ and $b_1, b_2 \ldots b_n$ are arbitrary functions of time; N is any integer;
   $0 \leq i \leq 2^N - 1$;
   $T_1, T_2 \ldots T_N$ are constants;
   $C = b_1 b_2 \ldots b_n$;
   and
   $K^{2(i-1)} = a_i / b_i$;
   and means for summing the tap outputs.

* * * * *